W. S. CRUM.
STOCK WATERING DEVICE.
APPLICATION FILED DEC. 15, 1908.
945,706.
Patented Jan. 4, 1910.
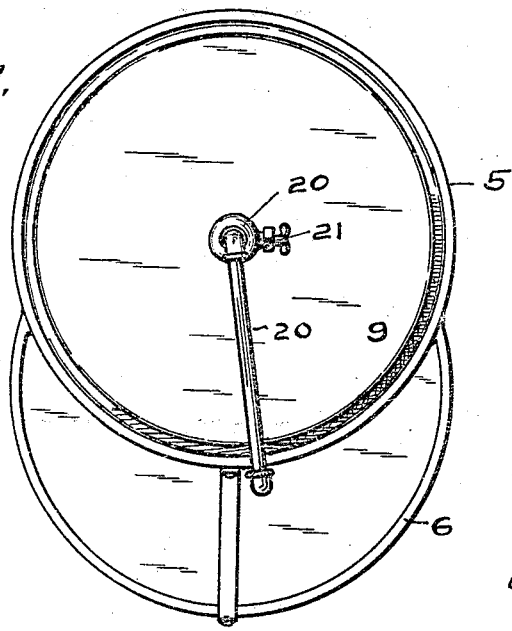
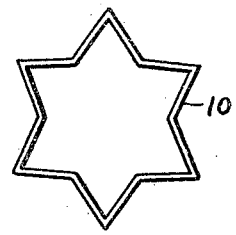
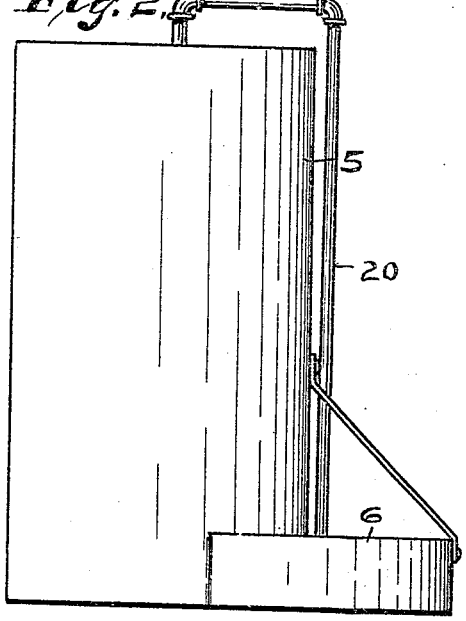
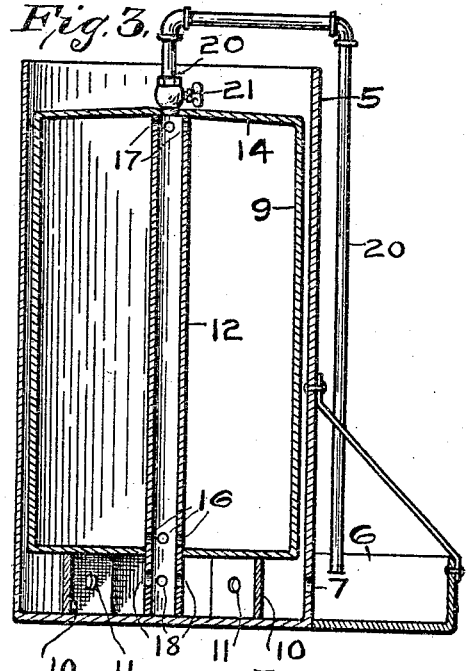
Witnesses;
L. B. Woerner
E. E. Miller
Inventor,
Winfield S. Crum,
By Minturn & Woerner,
Attorneys.

UNITED STATES PATENT OFFICE.

WINFIELD S. CRUM, OF SHIRLEY, INDIANA.

STOCK-WATERING DEVICE.

945,706.   Specification of Letters Patent.   Patented Jan. 4, 1910.

Application filed December 15, 1908. Serial No. 467,669.

*To all whom it may concern:*

Be it known that I, WINFIELD S. CRUM, a citizen of the United States, residing at Shirley, in the county of Hancock and State of Indiana, have invented certain new and useful Improvements in Stock-Watering Devices, of which the following is a specification.

The object of this invention is to provide a stock watering tank wherein fresh drinking water may be delivered automatically to a trough within reach of the animals to be watered and to provide means to prevent overflow of the trough by the expansive action of the air and change of temperature caused by the heat of the sun.

I accomplish the objects of my invention by the mechanism illustrated in the accompanying drawings, in which—

Figure 1 is a top plan view of my device. Fig. 2 a side elevation of the same on a somewhat smaller scale. Fig. 3 a central vertical section on the same scale as Fig. 2, and Fig. 4 a plan view of the corrugated wall which supports the inner tank.

Like characters of reference indicate like parts throughout the several views.

Referring to the drawings, 5 represents a tank here shown as cylindrical in shape and standing upon one of its ends, which end is closed. The opposite or upper end of the tank is open.

6 is a drinking trough which is connected to the lower end of the tank and communicates with the interior of the latter through an opening 7 adjacent to the bottom of tank 5.

Located within the tank 5 is an inner cylindrical drum or tank 9. The bottom of the tank 9 rests upon a supporting partition 10 which partition is preferably formed of sheet metal corrugated vertically in the manner shown in Fig. 4 for the purpose of increased rigidity. The width, or vertical dimensions of the partition 10 when in position for use is such as to locate the bottom of the tank 9 a little below the top of the trough 6. The walls of the partition 10 are provided with perforations 11 to permit of the unobstructed flow of water therethrough.

12 is a pipe which has its bearing upon the bottom of the outside tank 5. This pipe 12 extends through a suitable opening in the bottom of the tank 9 and terminates against the under side of the top 14 of the inner tank 9, and its principal function is to act as a support for said top 14. The joint between the pipe 12 and the bottom of the tank 9 is made water-tight. The pipe 12 is provided with the holes 16 adjacent to and above the bottom of tank 9 for the free passage of water therethrough, and the pipe 12 is also provided, adjacent to the top 14 of the inner tank 9, with the holes 17 for the passage of air therethrough. The pipe 12 is also provided with holes 18 between the bottom of the outer tank 5 and the bottom of the inner tank 9. These holes will preferably be approximately mid-way between the bottom of the inner and outer tanks whereby that portion of the pipe 12 between the bottom of the inner tank 9 and the holes 18 will form a downwardly extended sleeve-like extension of said inner tank 9. The lower end of said sleeve is located at such a distance from the inner bottom of the outside tank as the water is desired to stand in the outside trough, thereby regulating the depth of water both in the trough and in the bottom of the outer tank 5 and thereby leaving the space from the upper edge of said holes 18 to the bottom of the inner tank unoccupied by water when in a normal condition, which space will serve as a receptacle or storage chamber in connection with the unoccupied space in the trough for the water that is forced down from the inner tank by the expansion of air and water affected by atmospheric changes as from cold to hot.

The inner tank 9 terminates sufficiently below the top or outer tank 5 to provide a receptacle to receive water during the operation of filling the tank for use. The inner tank may be partially or completely filled during the operation of charging the device for use. This is accomplished by first closing the hole 7 by any suitable means and then by opening the lower end of the air pipe by removing the water in the trough to a point below the end of said pipe to permit the escape through the hole 17 of the pipe 12 and the air tube of the air contained within the tank 9. Then the water is poured into the top of the tank 5 in the space provided for that purpose by the shortening of the inner tank 9 as above described. The water will pass down between the walls of the tanks 5 and 9 into the space below the bottom of the tank 9 and thence through the holes 11 in the partition 10, through the holes 18 into the pipe 12 and out of the pipe 12 through the holes 16 into the inner tank 9, and the air displaced by the water entering the tank 9 will pass out through the holes 17 and through the open pipe 20. Discharge through the pipe 20 will be controlled by a valve 21 which will be normally open. When the inner tank 9 is thus filled the hole 7 will be open and the water in the trough will rise up in the lower end of said pipe thereby completely shutting off the pasage of air in said pipe. Thereupon the trough 6 will be filled to a level which submerges the holes 18 of the pipe 12. When the water in the trough 6 is reduced by the animals drinking it, to a level below the bottom of pipe 20, air will enter through the pipe 20 and accumulate at the top of tank 9 thereby displacing an equal volume of water which will raise the level in the trough 6 and the bottom of the tank 5 above the bottom of pipe 20 and stop the flow. The bottom portion of the tank 5, below the bottom of the tank 9, is practically a continuation of the trough 6 for the purpose of holding water. The heat of the sun will cause the air in the top of the inner tank 9 to expand, which expansion, as is well known, will cause a corresponding volume of water to be discharged from the tank 9. This discharge of water will be accommodated in the space of the trough 6 and its extension in the tank 9 above the normal water level determined by the open end of pipe 20. The capacity of the trough 6 and its extension, above this normal water level is ample to hold the discharge caused by expansion due to the sun's heat.

By keeping the valve 21 normally closed the water in the trough will stand at a level just sufficient to cover the holes 18, and when water in the trough falls below this level, air will enter through holes 18. The advantage in using the pipe 20 when the valve 21 is closed is that the possible emptying of the tank caused by possible leakage of the valve, is prevented.

Having thus fully described my invention, what I claim as new and wish to secure by Letters Patent of the United States, is—

1. In a device of the class described, an outside tank having an open top and an opening near its bottom, a drinking trough connected therewith, a second tank located within the first tank and extending below the upper line of said drinking trough, said second tank having a closed top and bottom and an opening through its bottom surrounded by a continuous flange which extends downwardly from said bottom and is perforated below a horizontal plane through the top of said opening to the drinking trough through said outside tank.

2. In a device of the class described, an outside tank having an open top and an opening near its bottom, a drinking trough connected therewith, a second tank located within the first tank and extending below the upper line of said drinking trough, said second tank having a closed top and bottom and a central opening through its bottom surrounded by a continuous flange which extends downwardly from said bottom and is perforated below a horizontal plane through the top of said opening to the drinking trough through said outside tank, a perforated partition surrounding said flange and supporting the said tank, said second tank having a top vent and means for opening and closing said vent.

3. In a device of the class described, an outside tank having an open top and a closed bottom, a drinking-trough connected therewith through an opening near the bottom of said tank, a pipe supported upon the bottom of said tank, a second tank within the first tank surrounding said pipe and extended below the upper line of said drinking-trough, said pipe having holes near the top of the second tank and other holes near the bottom of said second tank and still other holes approximately midway between the bottoms of the outer and inner tanks, and said second tank having a top vent and means to open and close said vent.

4. In a device of the class described, an outside tank, having an open top and a closed bottom, a drinking-trough connected therewith through an opening near the bottom of said tank, a pipe supported upon the bottom of said tank, a second tank within the first tank surrounding said pipe and extended below the upper line of said drinking-trough, said second tank having both ends headed and having its upper head supported by said pipe, said pipe having holes near the top of the second tank and other holes near the inside bottom of said second tank and still other holes approximately midway between the bottoms of the outer and inner tanks, and said second tank having a top vent and a valve to open and close said vent.

In witness whereof, I have hereunto set my hand and seal at Indianapolis, Indiana, this 15th day of July, A. D. one thousand nine hundred and eight.

WINFIELD S. CRUM. [L. S.]

Witnesses:
F. W. WOERNER,
L. B. WOERNER.